United States Patent [19]
Idosako et al.

[11] Patent Number: 5,188,477
[45] Date of Patent: Feb. 23, 1993

[54] BALL JOINT

[75] Inventors: Hidetaka Idosako; Masao Takayama, both of Hamamatsu, Japan

[73] Assignee: Kabushiki Kaisha Somic Ishikawa, Tokyo, Japan

[21] Appl. No.: 852,796

[22] Filed: Mar. 17, 1992

[30] Foreign Application Priority Data

Apr. 17, 1991 [JP] Japan .................... 2-085146

[51] Int. Cl.[5] ............................. F16C 11/00
[52] U.S. Cl. ................... 403/133; 403/138; 403/132
[58] Field of Search ............ 403/132, 133, 137, 138

[56] References Cited

U.S. PATENT DOCUMENTS

| | | | |
|---|---|---|---|
| 3,066,963 | 12/1962 | Vogt | 403/138 |
| 4,225,260 | 9/1980 | Gaines | 403/132 X |
| 4,353,660 | 10/1982 | Parks | 403/132 |
| 4,995,755 | 2/1991 | Hyodo et al. | 403/137 X |

FOREIGN PATENT DOCUMENTS

90713 7/1980 Japan .................... 403/132

Primary Examiner—Andrew V. Kundrat
Attorney, Agent, or Firm—Morrison Law Firm

[57] ABSTRACT

A ball joint resiliently positions a portion of its hard-plastic bearing seat a short distance from a load-receiving portion of its housing. A compression load is capable of urging the bearing seat and the load-receiving portion into contact with each other to limit the load absorbed by the resilient member. This permits the resilient member to apply an appropriate bearing preload to overcome manufacturing tolerances in the parts, without requiring the resilient member to support large compression loads.

6 Claims, 7 Drawing Sheets

BALL JOINT

BACKGROUND OF THE INVENTION

1. Field of the Invention

The present invention relates to a ball joint used for the steering mechanism or the suspension mechanism of an automobile and, more particularly, to a ball joint used at the rack-shaft end of the tie-rod of a rack-and-pinion type steering device.

2. Description of the Prior Art

Figure 9:
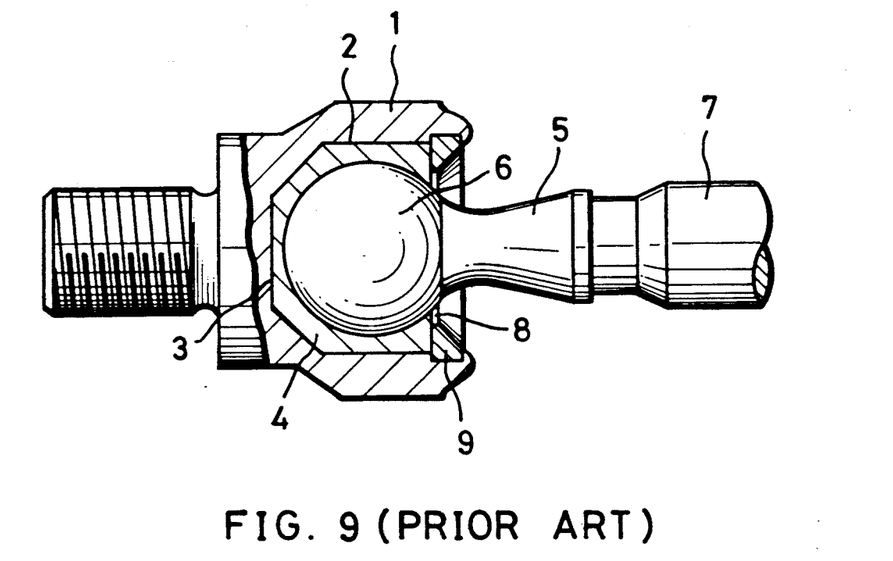
FIG. 9 is an enlarged vertical cross section of a part of an embodiment of a ball joint according to the prior art.

As shown in FIG. 9, a conventional ball joint includes a housing 1 having an inner chamber 2 containing a hard plastic bearing seat 4 at a bottom 3 thereof. A ball head portion 6 of a ball stud 5 is slidably engaged in bearing seat 4. A projecting stud portion 7, which is integrally connected to ball head portion 6, extends through an aperture 8 of inner chamber 2. A plug 9, fitted into aperture 8, holds bearing seat 4 and ball head 6 of ball stud 5 in inner chamber 2 of housing 1.

The above prior-art structure presents a problem in that it is difficult to absorb dimensional tolerances of the parts that comprise housing 1, bearing seat 4, ball stud 5 and plug 9. As a result, it is difficult to stabilize the characteristics of a ball joint when it is assembled with a tie-rod or other mechanical part. The difficulty in controlling tolerances carries with it the danger that wear of bearing seat 4 and rattling due to setting of bearing seat 4 caused by load, may occur with use.

Figure 10:
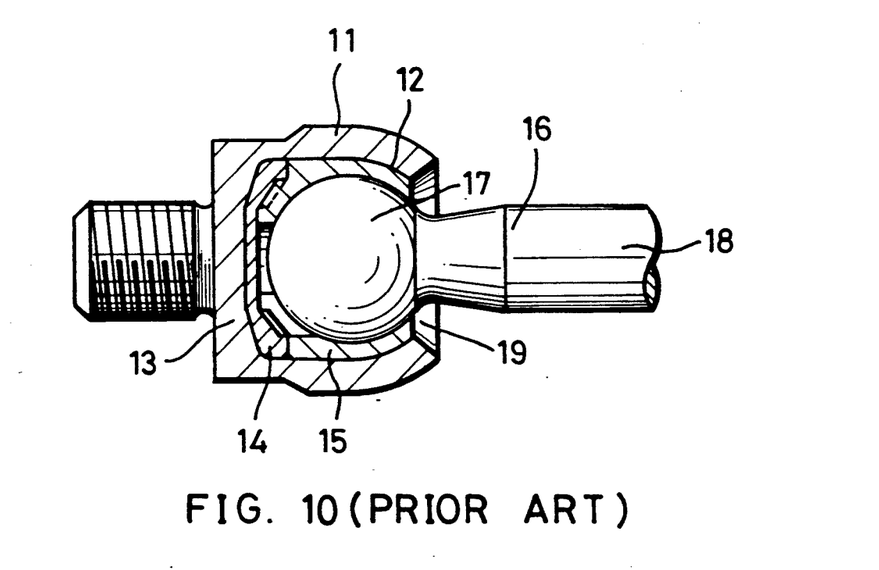
FIG. 10 is an enlarged vertical cross section of a part of another example of a ball joint of the prior art.

One approach to solving the above problems is disclosed in Japanese Utility Model Publication No. 7848/1989. As shown in FIG. 10, a ball joint according to the above publication includes an elastic member 14, of synthetic resin, fitted in the bottom 13 of an inner chamber 12 of a housing 11. A bearing seat 15, of hard synthetic resin, is fitted in inner chamber 12. A ball head portion 17 of a ball stud 16 is slidably enveloped in bearing seat 15. A stud portion 18, integrally connected to ball head portion 17, projects from an aperture 19 of inner chamber 12. Aperture 19 of housing 11 is caulked or crimped to hold ball head portion 17 in place, and thereby prevent it from slipping out of inner chamber 12 of housing 11.

According to the structure of a ball joint shown in FIG. 10, it is possible for elastic member 14 to absorb the dimensional tolerances of the principal parts consisting of housing 11, bearing seat 15 and ball stud 16, thereby stabilizing working torque. When load, especially compression load, is applied to ball stud 16, however, the load is conveyed to elastic member 14 through bearing seat 15. If the load is large, it causes setting of elastic member 14, thereby reducing durability.

OBJECTS AND SUMMARY OF THE INVENTION

In order to solve the above problems, it is an object of the present invention to provide a ball joint which is capable of absorbing dimensional tolerance of the parts that comprise a housing, a bearing seat and a ball stud, thereby producing stable working torque when assembled, and which has increased load tolerance and superior durability and operational stability.

Briefly stated, the present invention provides a ball joint that resiliently positions a portion of its hard-plastic bearing seat a short distance from a load-receiving portion of its housing. A compression load is capable of urging the bearing seat and the load-receiving portion into contact with each other to limit the load absorbed by the resilient member. This permits the resilient member to apply an appropriate bearing preload to overcome manufacturing tolerances in the parts, without requiring the resilient member to support large compression loads.

According to an embodiment of the invention, there is provided a ball joint comprising: a housing, an inner chamber in the housing having a bottom at a first inner end thereof and an aperture at second end thereof, a ball stud, the ball stud including a ball head portion, and a stud portion connected to each other, a bearing seat in the inner chamber, the bearing seat enveloping a substantial portion of the ball head portion, and slidably securing the ball head portion therein, with the stud portion extending from the aperture, a load bearing portion of the bearing seat facing the bottom, an elastic member between the bearing seat and an inner surface of the housing, the elastic member being effective to resiliently urge the bearing seat such that the load bearing portion is urged out of contact with the bottom and a bearing preload is applied to the ball head portion, and the elastic member being compressible under a compression load to permit the load bearing portion to contact the bottom, whereby compression forces are transferred to the bottom.

According to a feature of the invention, there is provided a ball joint comprising: a housing, a generally cylindrical inner chamber in the housing, a bearing seat in the inner chamber, a ball stud including a ball head portion and a stud portion, the bearing seat surrounding a substantial portion of the ball head portion, an elastic member between a bottom of the inner chamber and the bearing seat, the elastic member applying a resilient urging force to the bearing seat whereby a bearing preset is applied to the ball head portion, means for positioning a portion of the bearing seat spaced a predetermined distance from a load receiving surface of the housing, and means for permitting the elastic member to be compressed by forces applied to the ball stud, sufficiently to contact the portion of the bearing seat with the load receiving surface, whereby compression of the elastic member is limited to the predetermined distance regardless of further increases in the forces.

A ball joint according to the present invention consists of a housing in which an inner chamber having an aperture at one end and the bottom at the other end thereof is formed; a ball stud consisting of the head portion to be contained in the inner chamber of the housing and the stud portion, which is integrally connected to said ball portion and projects from said aperture of the inner chamber; a bearing seat which is contained in the inner chamber of the housing together with the ball head of the ball stud and has a load bearing surface facing the bottom of the inner chamber of the housing, the bearing seat enveloping the ball head of the ball stud in such a manner that the ball head is able to slide therein; and an elastic member which is placed between said bearing seat and the inner surface of the housing in order to maintain space between a load receiving portion of the bearing seat and the bottom of the inner chamber of the housing and apply preload to said ball stud.

A ball joint according to the present invention absorbs dimensional tolerance of parts that comprise a housing, a ball stud and a bearing seat by means of preload by an elastic member in order to produce stable working torque when installed. Furthermore, when the ball stud receives a load, especially a compressed load, the load receiving surface of the bearing seat abuts against the bottom of the inner chamber of the housing, the bearing seat thus receives the load, so that no setting of the elastic member is caused even when the load is large. As a consequence, a ball joint according to the present invention is free from the danger of rattling and has superior load resistance and constant working stability.

The above, and other objects, features and advantages of the present invention will become apparent from the following description read in conjunction with the accompanying drawings, in which like reference numeral designate the same elements.

DETAILED DESCRIPTION OF PREFERRED EMBODIMENTS

Referring to FIGS. 1 through 5, a metal-molded cylindrical housing 21, shown before assembly in FIG. 3, includes an inner chamber 24 having an aperture 22 at one end thereof and a bottom portion 23 at the other end. The surface of housing 21 around bottom portion 23 of inner chamber 24 is formed into a generally arc-shaped or chamfered surface 25. A part of housing 21 from arc-shaped surface 25 to the middle of bottom portion 23 is shaped into a generally conical-shaped concavity 26.

A ball stud 31 (FIGS. 1 and 2) consists of a ball head portion 32 and a stud portion 34 connected together by a small diameter portion 33. A threaded portion 35 is formed on the end of stud portion 34.

Figure 4:
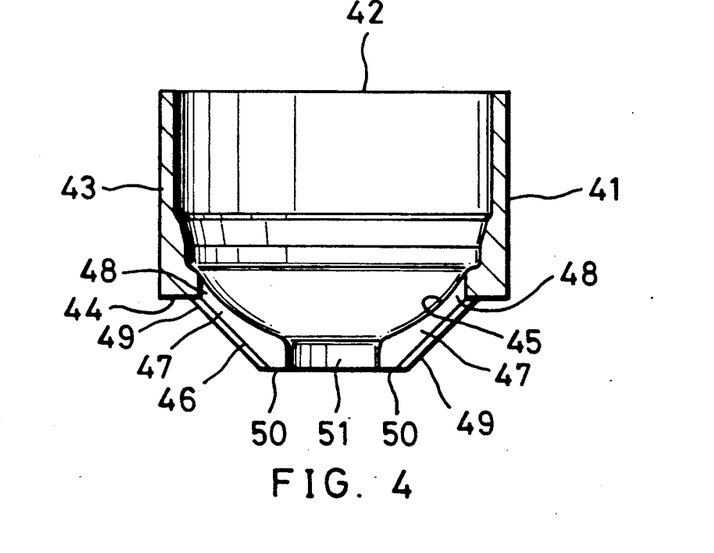
FIG. 4 is a vertical cross section of the bearing seat of the ball joint of FIG. 1 before assembly.

A bearing seat (FIG. 4) is made of polyathetale or other kind of hard synthetic resin that has superior bearing characteristics and load tolerance. As shown in FIG. 4, before it is assembled into a ball joint, a bearing seat 41 has an aperture 42 at one end and a generally cylindrical body 43 with a bottom shaped to accommodate ball head portion 32 of ball stud 31. An annular-shaped catching surface 44 is formed around the outer surface of the bottom of bearing seat 41. A dome-shaped projecting portion 46, having an inner surface 45 describing a spherical arc, closes the bottom of bearing seat 41. A plurality of grooves 47, extending from catching surface 44 toward the center of projecting portion 46, form tongue portions 48. Each tongue portion 48 includes a ridge 49 having a trapezoidal section formed thereon. Each tongue portion 48 of bearing seat 41 also includes a load receiving surface 50 in the form of a ring facing generally conical-shaped concavity 26 on bottom 23 of housing 21, with a minimal space h (FIG. 1) therebetween. An aperture 51 is positioned at the center of each load receiving surface 50.

Figure 5:
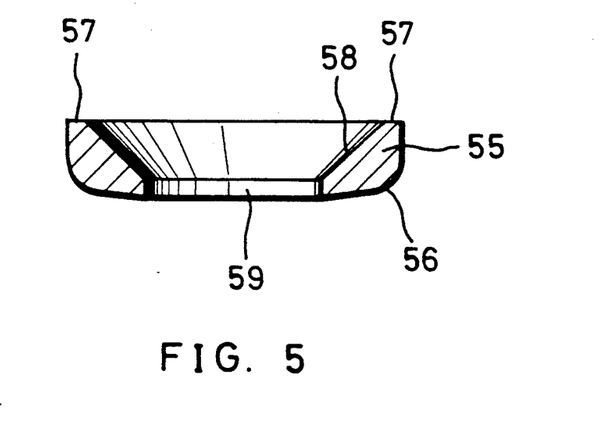
FIG. 5 is a vertical cross section of the elastic member of the ball joint of FIG. 1 before assembly.

Referring now also to FIG. 5, an elastic member 55 of polyurethane, polyester or other similar synthetic resin or rubber describes an annular shape having an outer abutting surface 56 for abutting arc surface 25 of bottom portion 23 (FIGS. 1, 2, 3) of inner chamber 24 of housing 21. A catching edge 57, at an end of the inner surface of elastic member 55 contacts catching surface portion 44 of bearing seat 41. An inner surface of elastic member 55 contains a generally conical-shaped catching concavity 58 against which ridges 49 of bearing seat 41 abut. An aperture 59 through the center of elastic member 55 permits load receiving surfaces 50 of bearing seat 41 to face bottom portion 23 of housing 21.

Figure 1:
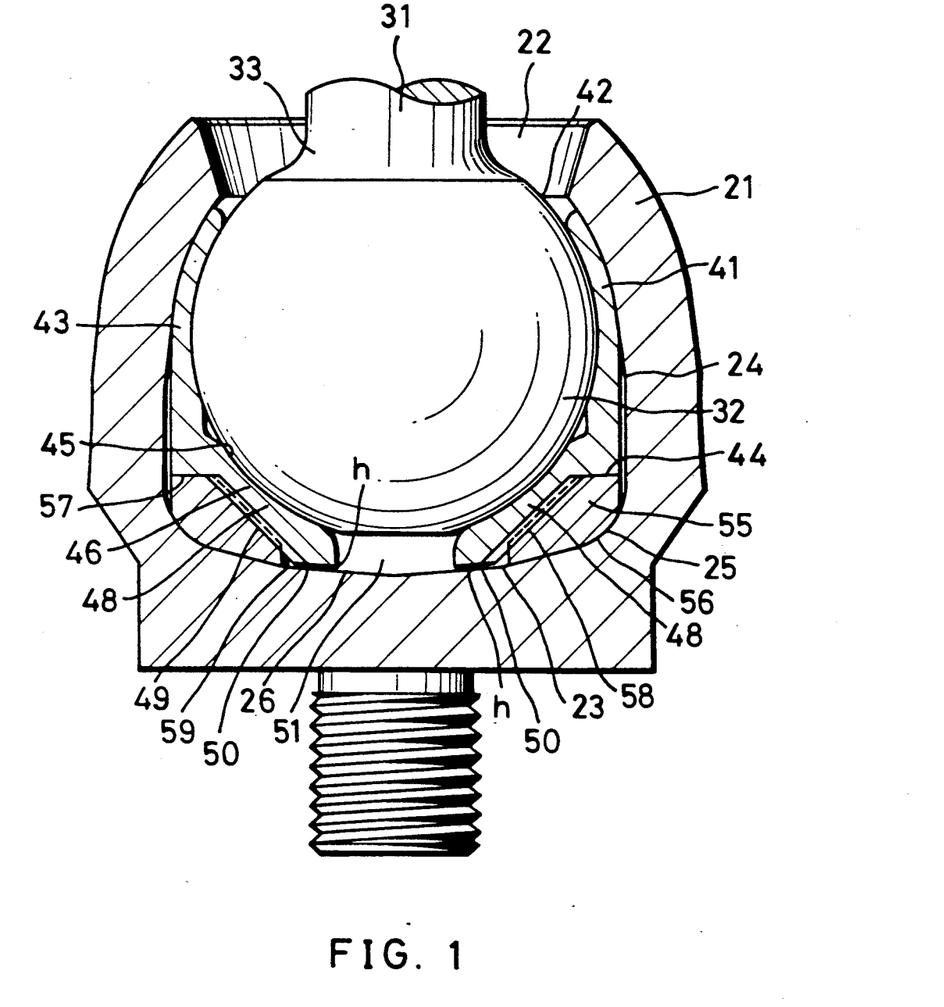
FIG. 1 is an enlarged vertical cross section of a ball joint according to an embodiment of the present invention.
Figure 2:
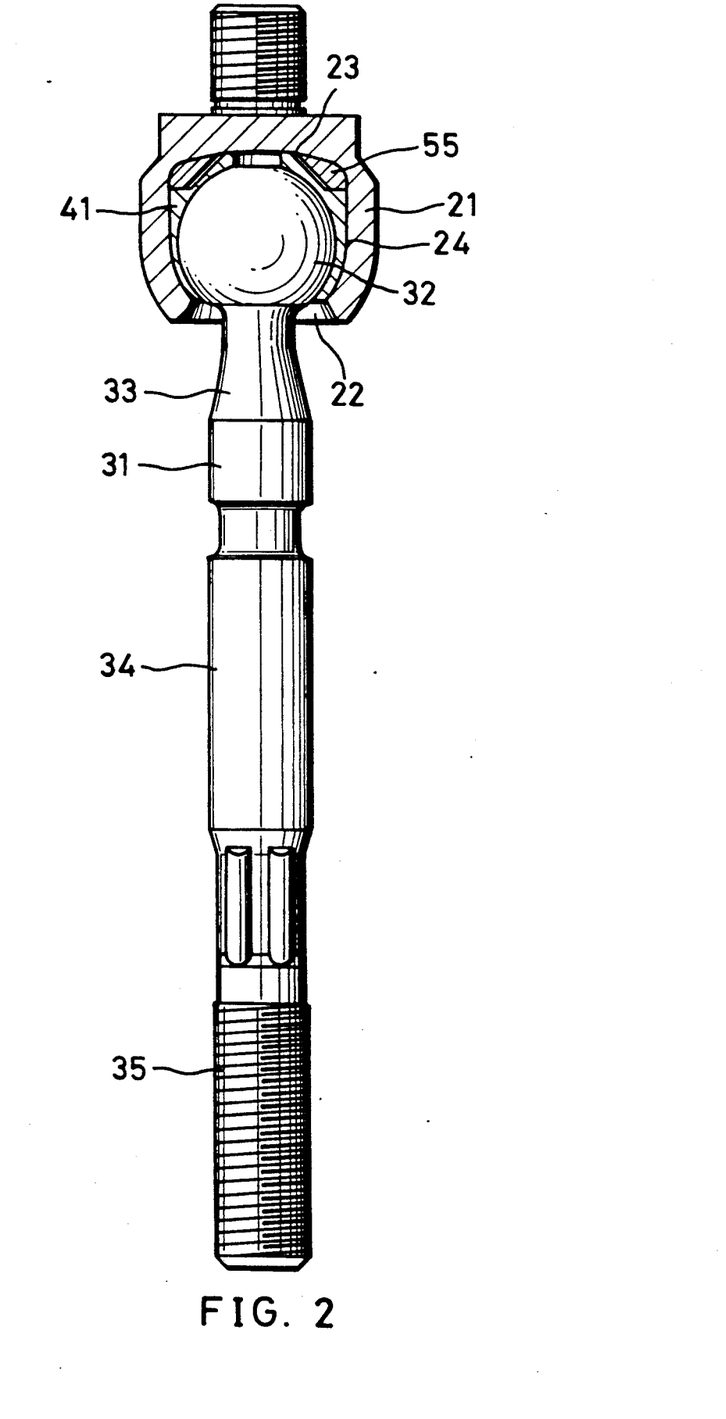
FIG. 2 is a vertical cross section of the ball joint of FIG. 1.
Figure 3:
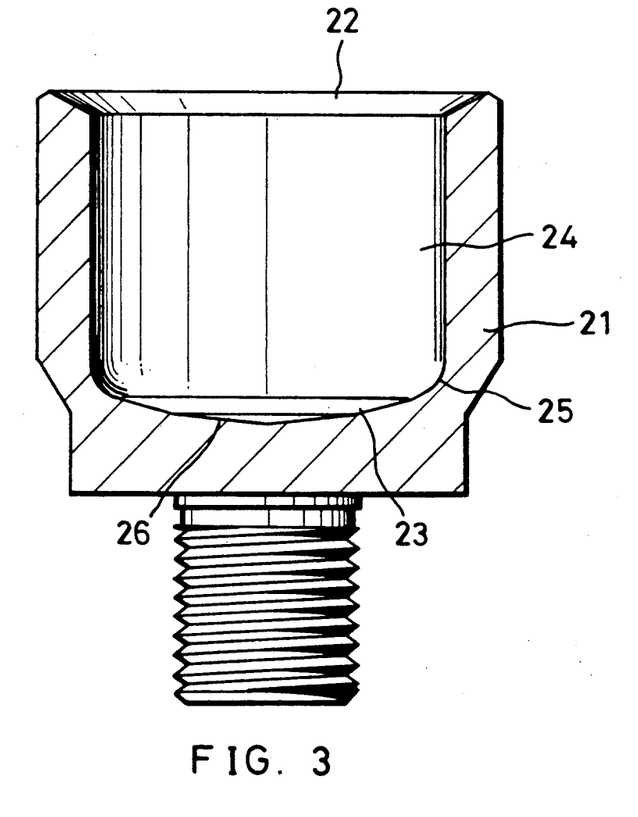
FIG. 3 is a vertical cross section of the housing of the ball joint of FIG. 1 before assembly.

Next, the function of the present embodiment is explained hereunder. First of all, elastic member 55 is inserted from aperture 22 and fitted in housing 21 so that abutting surface 56 of elastic member 55 abuts against arc-shaped surface 25 of bottom portion 23 of housing 21. Then, ball head portion 32 of ball stud 31 is inserted from aperture 42 at one end of the bearing seat 41 into body portion 43, stud portion 34 of ball stud 31 is fitted into housing 21 through aperture 22 thereof, and bearing seat 41 that now envelops ball head portion 32 of ball stud 31 is inserted from aperture 22 of housing 21 into inner chamber 24. Catching edges 57 engage catching surface 44 of bearing seat 41, with ridges 49 abutting catching concavity 58. Load receiving surface 50 of bearing seat 41 is fitted in opening 59 of elastic member 55 to face generally conical-shaped concavity 26 of bottom portion 23 of housing 21, with minimal space h therebetween. With the assembly in the above condition, the edge of aperture 22 of housing 21 is caulked or rolled to retain the elements in the positions shown, and thereby to complete the assembly of the ball joint.

When a ball joint having the above structure is assembled in the manner described above, ridges 49 of bearing seat 41 contact catching concavity 58 of elastic member 55. A proper degree of elasticity of elastic member 55 absorbs dimensional tolerances of the remaining parts that comprise housing 21, ball stud 31 and bearing seat 41. Preload is applied to ball head portion 32 of ball stud 31 through respective tongue portions 48 by means of the reaction force of elastic member 55 whereby slide resistance in operation ensures stable working torque on ball stud 31.

When a compression load is applied to ball stud 31, elastic member 55 is compressed so that load receiving surface 50 of bearing seat 41 is deflected the distance h into abutment with bottom portion 23 of inner chamber 24, thereby transferring the load to bearing seat 41. Due to this load transfer the ball joint of the present invention is capable of sustaining large compression thrusts without inducing a permanent set in elastic member 55. Therefore, a ball joint according to the present invention has superior load tolerance and always provides stable performance because it is free from the danger of setting of elastic member 55 and rattling even under a large load.

Figure 6:
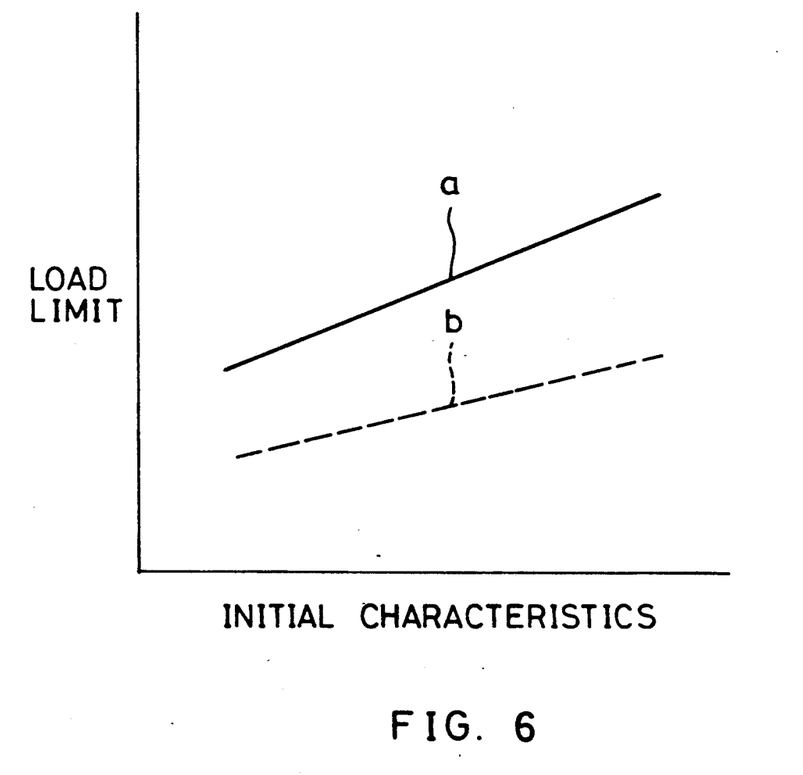
FIG. 6 is a characteristic diagram of ball joints.

Referring now to FIG. 6, a ball joint having the structure of the present embodiment exhibits a load tolerance shown by the curve 'a', as compared to a load tolerance 'b' exhibited by a ball joint according to the prior art. Quantitatively, the initial value of curve 'a' exceeds that of curve 'b' by about 300 kgt. It can be seen that a ball joint according to the present invention has superior load tolerance compared to a conventional ball joint.

Figure 7:
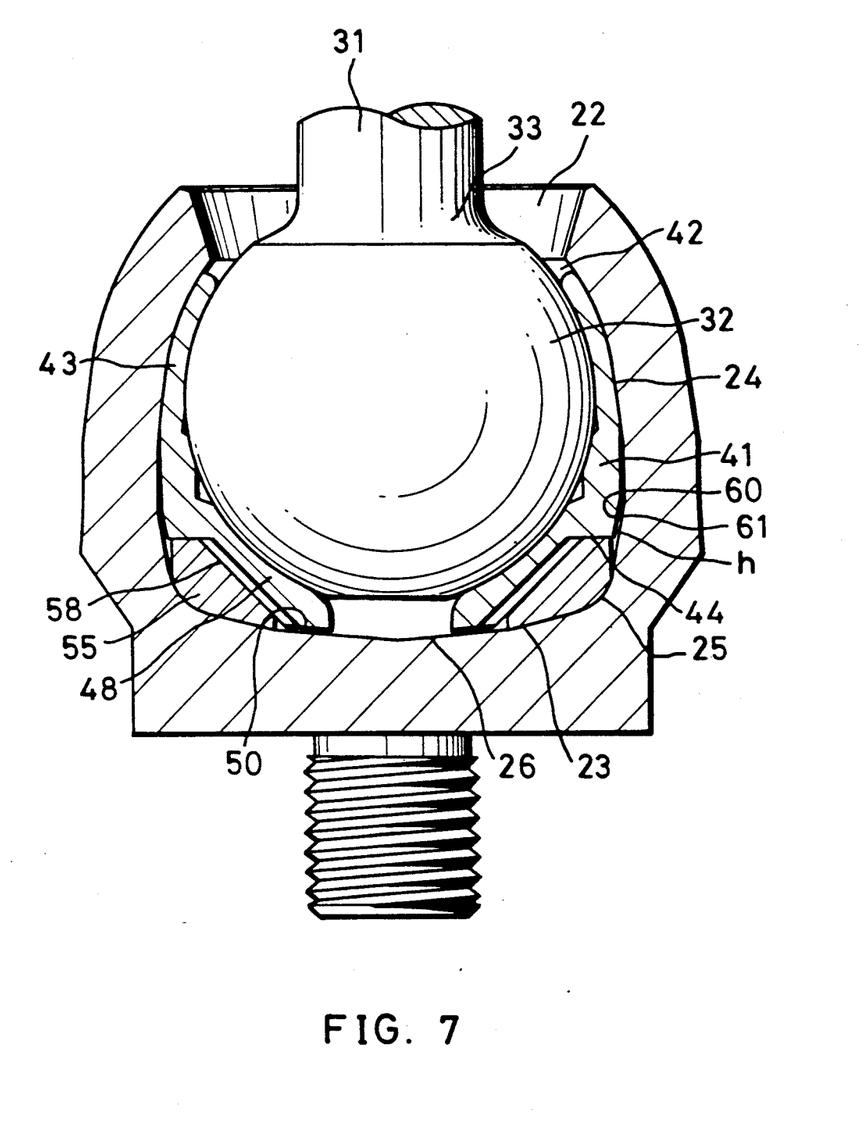
FIG. 7 is an enlarged vertical cross section of a part of a ball joint according to another embodiment of the present invention.

Referring now to FIG. 7, a further embodiment of the invention has the same structure as the first embodiment explained above, except for the presence of a tapered load receiving surface 60 on the bottom of bearing seat 41 around annular catching surface 44, and a tapered bottom 61 around arc-shaped surface 25 of bottom portion 23 of housing 21. Tapered surface 60 and tapered bottom 61 face each other with a minimal space h therebetween.

In use, when a compression load is applied to ball stud 31, elastic member 55 is compressed to bring load receiving surface 50 and tapered load receiving surface 60 of bearing seat 41 respectively into contact with bottom portion 23 of inner chamber 24 of housing 21 and tapered bottom 61 of housing 21. Bearing seat 41 consequently receives the load at two places.

Figure 8:
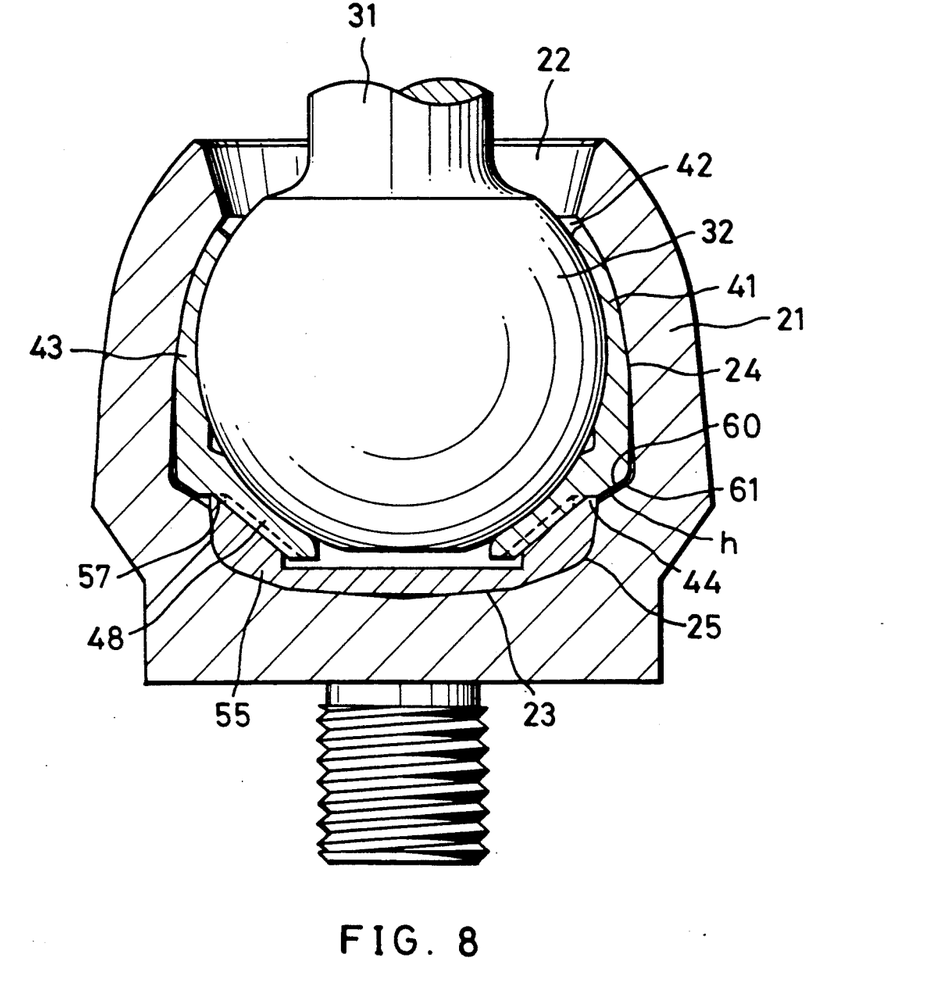
FIG. 8 is an enlarged vertical cross section of a part of a ball joint according to another embodiment of the present invention.

Referring now to FIG. 8, a further embodiment of the invention includes a tapered load receiving surface 60 radially outside annular catching surface 44 around the bottom of bearing seat 41. A tapered bottom 61 is disposed around arc-shaped surface 25 of bottom portion 23 of housing 21 in such a manner that tapered bottom 61 faces tapered load receiving surface 60 of bearing seat 41 with minimal space h therebetween.

In use, when a compression load is applied to ball stud 31, elastic member 55 is compressed until tapered load receiving surface 60 of bearing seat 41 is urged into abutment with tapered bottom 61 of housing 21. This transfers compression forces to bearing seat 41 at a single place.

According to the present invention, it is possible to accommodate dimensional tolerance of parts comprising the housing, the ball stud and the bearing seat of a ball joint by means of an elastic member, and because of preloading by the elasticity of the elastic member, it is possible to obtain stable working torque after installation of a ball joint. Furthermore, when a compression load is applied to a ball stud, a load receiving surface of the bearing seat is urged into abutment with the bottom of the inner chamfer of the housing so that the bearing seat receives the load, thereby reducing the load that would otherwise be applied to the elastic member. As a result, even where a large compression load is applied, no setting of the elastic member nor rattling of the ball joint is caused, and therefore load tolerance and working stability of the ball joint is improved. The present invention also makes possible the miniaturization of a ball joint, thereby reducing its weight and production cost.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball joint comprising:
a housing;
an inner chamber in said housing having a bottom at a first inner end thereof and an aperture at second end thereof;
a ball stud;
said ball stud including a ball head portion, and a stud portion connected to each other;
a bearing seat in said inner chamber;
said bearing seat enveloping a substantial portion of said ball head portion, and slidably securing said ball head portion therein, with said stud portion extending from said aperture;
a load bearing portion of said bearing seat facing said bottom;
an elastic member between said bearing seat and an inner surface of said housing;
said elastic member being effective to resiliently urge said bearing seat such that said load bearing portion is urged out of contact with said bottom and a bearing preload is applied to said ball head portion; and
said elastic member being compressible under a compression load to permit said load bearing portion to contact said bottom, whereby compression forces are transferred to said bottom.

2. A ball joint comprising:
a housing;
a generally cylindrical inner chamber in said housing;
a bearing seat in said inner chamber;
a ball stud including a ball head portion and a stud portion;
said bearing seat surrounding a substantial portion of said ball head portion;
an elastic member between a bottom of said inner chamber and said bearing seat;
said elastic member applying a resilient urging force to said bearing seat whereby a bearing preset is applied to said ball head portion;
means for positioning a portion of said bearing seat spaced a predetermined distance from a load receiving surface of said housing; and
means for permitting said elastic member to be compressed by forces applied to said ball stud, sufficiently to contact said portion of said bearing seat with said load receiving surface, whereby compression of said elastic member is limited to said predetermined distance regardless of further increases in said forces.

3. Apparatus according to claim 2, wherein said means for positioning includes:
said elastic member including a central opening; and
said bearing seat including an element extending through said central opening to position a portion of said element said predetermined distance from said load receiving surface.

4. A ball joint comprising:
a housing;
a generally cylindrical inner chamber in said housing;
a bearing seat in said inner chamber;
a ball stud including a ball head portion and a stud portion;
said bearing seat surrounding a substantial portion of said ball head portion;
an elastic member between a bottom of said inner chamber and said bearing seat;
said elastic member applying a resilient urging force to said bearing seat whereby a bearing preset is applied to said ball head portion;

means for positioning a portion of said bearing seat spaced a predetermined distance from a load receiving surface of said housing;

means for permitting said elastic member to be compressed by forces applied to said ball stud, sufficiently to contact said portion of said bearing seat with said load receiving surface, whereby compression of said elastic member is limited to said predetermined distance regardless of further increases in said forces; and said means for positioning includes:

said elastic member including a central opening;

said bearing seat including an element extending through said central opening to position a portion of said element said predetermined distance from said load receiving surface; and said element includes a plurality of tongue portions connected at one end to said bearing seat.

5. Apparatus according to claim 2, wherein said means for positioning includes:

an annular load-receiving surface in said inner chamber;

an annular surface on said bearing seat facing said load-receiving surface; and said predetermined distance being between said annular load-receiving surface and said annular surface on said bearing seat.

6. Apparatus according to claim 5, wherein said means for positioning further includes:

said annular load-receiving surface being disposed radially outward of said elastic member;

a central opening in said elastic member; and said bearing seat further including an element extending through said central opening to position a portion of said element said predetermined distance from said load receiving surface.

* * * * *

UNITED STATES PATENT AND TRADEMARK OFFICE
CERTIFICATE OF CORRECTION

PATENT NO. : 5,188,477
DATED : February 23, 1993
INVENTOR(S) : Hidetaka IDOSAKO et al It is certified that error appears in the above-indentified patent and that said Letters Patent is hereby corrected as shown below:

Change Item [30] on cover sheet to read as follows:

--Apr. 17, 1991 [JP] Japan ............3-085146 --.

Signed and Sealed this

Fourteenth Day of June, 1994

Attest:

BRUCE LEHMAN

*Attesting Officer*        Commissioner of Patents and Trademarks